United States Patent [19]
Lin

[11] Patent Number: 5,499,573
[45] Date of Patent: Mar. 19, 1996

[54] BARBECUE GRILL

[76] Inventor: Patrick Lin, 14th Fl., No. 128, Sec. 3, Min Sheng E. Rd., Taipei, Taiwan

[21] Appl. No.: 511,539

[22] Filed: Aug. 4, 1995

[51] Int. Cl.⁶ ................................................. A47J 37/00
[52] U.S. Cl. .......................... 99/337; 99/450; 99/645; 126/25 R; 126/9 R
[58] Field of Search ................... 99/337, 338, 450, 99/481, 482, 444–446, 645; 126/25 R, 9 R, 41 R, 25 A, 37 B, 194, 197, 211, 25 C; 16/357

[56] References Cited

U.S. PATENT DOCUMENTS

| | | | |
|---|---|---|---|
| 3,611,915 | 10/1971 | Glaser et al. | 126/25 R |
| 3,712,819 | 1/1973 | Field | 99/645 |
| 3,714,937 | 2/1973 | Linstead | 126/25 R |
| 3,734,076 | 5/1973 | Koziol | 126/25 R |
| 4,957,039 | 9/1990 | Reyes | 99/450 |
| 5,111,802 | 5/1992 | Lin | 126/25 R |
| 5,429,039 | 7/1995 | Chang | 99/337 |

Primary Examiner—Timothy P. Simone
Attorney, Agent, or Firm—Kirkpatrick & Lockhart

[57] ABSTRACT

A barbecue grill includes a fire bowl for supporting a plurality of grids, two pairs of legs extending from the fire bowl for supporting the barbecue grill above the ground, a lid with a grip in the center, top portion thereof, a resilient handle secured on the opposite sides of the fire bowl via two fixation blocks each defining an L-shaped channel for receiving the handle and an aperture in the corner of the L-shaped channel for the handle to extend therethrough and couple with the fire bowl so that a user may expand the resilient handle and pivotally adjust a position of the handle and the lid may be retained in a vertical position among the fire bowl, one pair of the legs, and the handle when the handle is in a horizontal position.

1 Claim, 3 Drawing Sheets

BARBECUE GRILL

BACKGROUND OF THE INVENTION

The present invention relates to a barbecue grill, and particularly to a barbecue grill which provides a handle for a user to carry by one hand.

A conventional barbecue grill is composed of a fire bowl extending four legs, a lid, a pair of ear handles oppositely disposed on a peripheral edge of the fire bowl, and a plurality of grids secured with the fire bowl. Thus, it is very inconvenient for a user to carry the barbecue grill by hand. Further, as the lid has to be removed from the fire bowl during cooking, the lid is not used but still occupies additional space. Thus, there is a need to provide a barbecue grill with a better function.

SUMMARY OF THE INVENTION

An object of the present invention is to provide a barbecue grill which has a handle for a user to easily carry the barbecue grill.

Another object of the present invention is to provide a barbecue grill which has a holding device for securing the lid in place and preventing grease caused by cooking from splashing out of the barbecue grill as well as functioning as a wind shield.

According to the present invention, a barbecue grill includes a fire bowl for supporting a plurality of grids thereon, two pairs of legs extending from the fire bowl for supporting the barbecue grill above the ground, a lid with a grip in a center, top portion thereof, a resilient handle secured on the opposite sides of the fire bowl via two fixation blocks each defining an L-shaped channel for receiving the handle and an aperture in the corner of the L-shaped channel for the handle to extend therethrough and couple with the fire bowl so that a user may expand the resilient handle and pivotally adjust a position of the handle and the lid may be retained vertically among the fire bowl, one pair of legs, and the handle when the handle is in a horizontal position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
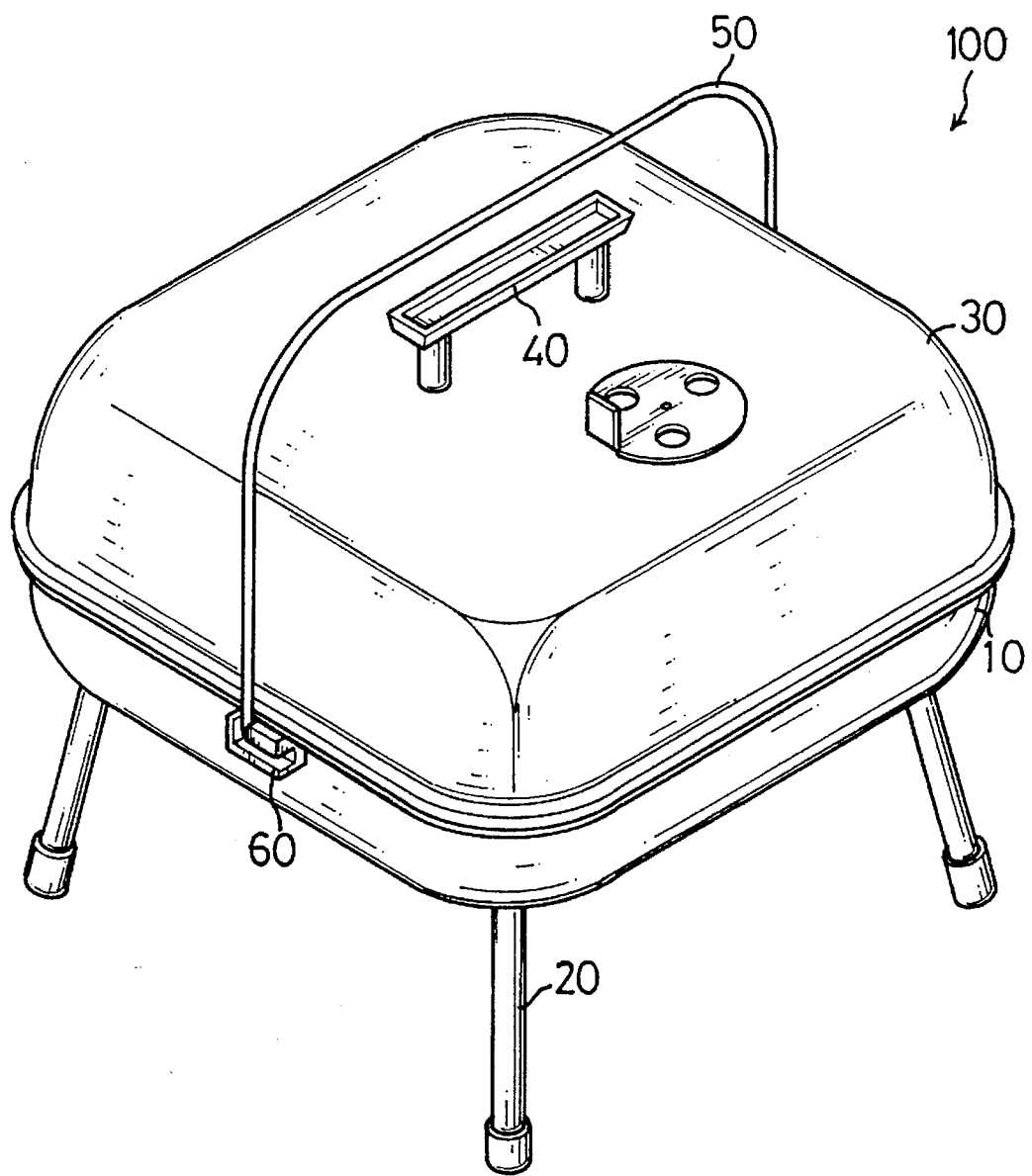
FIG. 1 is a perspective view of the barbecue grill of the present invention.

As shown in FIG. 1, a barbecue grill 100 includes a fire bowl 10, two pairs of legs 20 extending from the fire bowl 10 for supporting the fire bowl 10, a lid 30 sized to fit on a top of the cover the fire bowl 10, a plurality of grids (not shown) placed in the fire bowl, a grip 40 secured in a center, top portion of the lid 30, and a resilient handle 50 secured on opposite sides of the fire bowl 10 via two fixation blocks 60. In this arrangement, a user may carry the barbecue grill 100 by holding the handle 50 with one hand.

Figure 2:
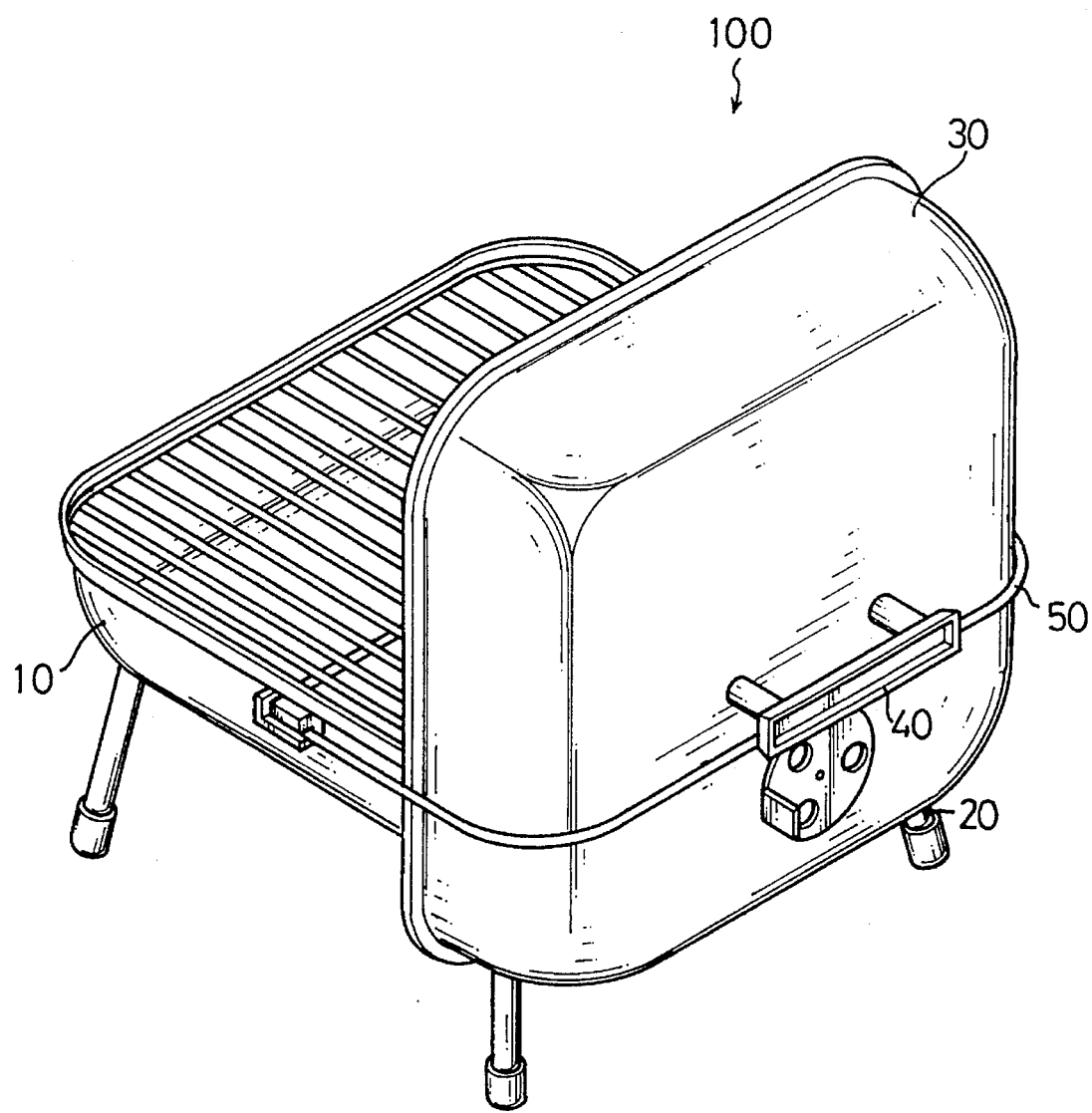
FIG. 2 is a perspective view showing the barbecue grill of FIG. 1 with a lid opened.

In FIG. 2, the lid 30 of the barbecue grill 100 has been removed from the top of the fire bowl 10 and placed vertically abut one pair of legs 20, the handle 50 is moved to a horizontal position with the grip 40 rests on the handle 50 for preventing grease caused by cooking from splashing out of the barbecue grill 100 and shielding the fire bowl 10 from undesirable winds.

Figure 4:
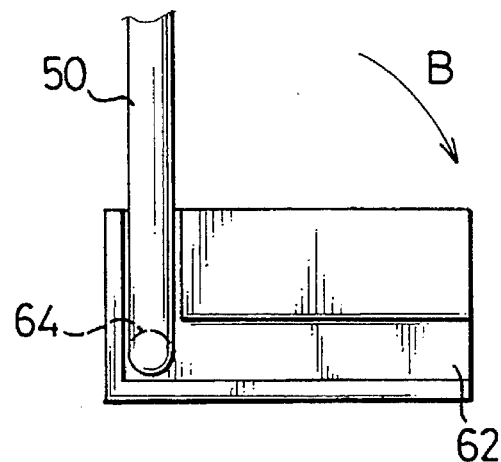
FIG. 4 is a plan view of the fixation block of the FIG. 3.
Figure 3:
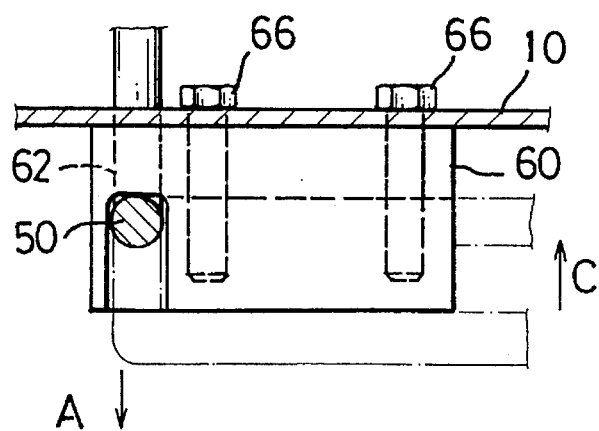
FIG. 3 is a cross-sectional view of a fixation block of the barbecue grill according to the present invention.

Referring to FIGS. 3 and 4, each fixation block 60 according to the present invention has an L-shaped channel 62 for receiving the handle 50, an aperture 64 (shown in phantom lines) defined in a corner of the L-shaped channel 62 for a tip of the handle 50 to pass through and secure onto the fire bowl 10, and two screws 66 for mounting the block 60 onto the fire bowl 10.

When the user intends to adjust the handle 50 into the horizontal position as shown in FIG. 2, the user has to expand ends of the handle 50 in directions away from the fire bowl 10 such as shown by arrow A, then pivotally move the handle 50 in a direction shown by arrow B as shown in FIG. 4 and release the handle 50 to allow the handle 50 to be received within the channel 62 in a direction of arrow C shown in FIG. 3. After the handle 50 has been placed in the horizontal position, the user may remove the lid 30 and rest the grip 40 of the lid 30 against the handle 50 to achieve the object mentioned.

Although the invention has been explained in relation to its preferred embodiment, it is to be understood that many other possible modifications and variations can be made without departing from the spirit and scope of the invention as hereinafter claimed.

I claim:

1. A barbecue grill comprising:

a fire bowl for supporting a plurality of grids;

a plurality of legs extending from the fire bowl for supporting the fire bowl;

a lid with a grip in a center, top portion thereof;

a resilient handle secured on the opposite sides of the fire bowl via two fixation blocks secured on the fire bowl each defining an L-shaped channel for receiving the handle and an aperture in a corner of the L-shaped channel for the handle to extend therethrough and couple with the fire bowl so that a user may expand the resilient handle and pivotally adjust a position of the handle and the lid may be retained vertically among the fire bowl, one pair of the legs, and the handle when the handle is in a horizontal position.

* * * * *